May 17, 1960  A. A. WHITE  2,936,840
STEERING STRUCTURE FOR FARM IMPLEMENTS AND THE LIKE
Filed June 18, 1956  4 Sheets-Sheet 1

INVENTOR.
Allen Andrew White
BY
ATTORNEY

May 17, 1960   A. A. WHITE   2,936,840
STEERING STRUCTURE FOR FARM IMPLEMENTS AND THE LIKE
Filed June 18, 1956   4 Sheets-Sheet 2
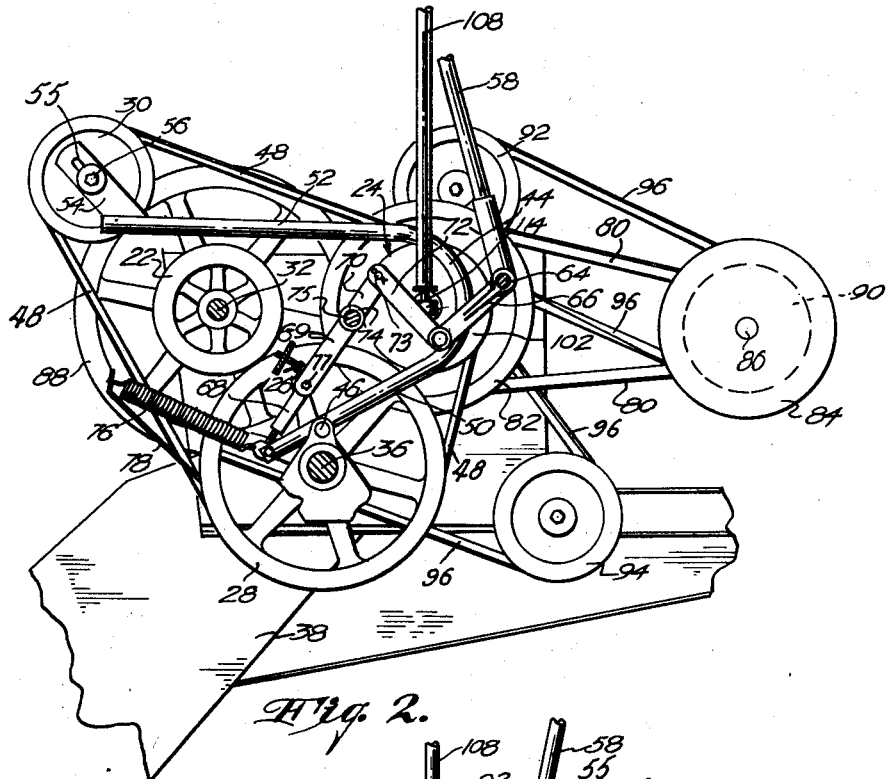
Fig. 2.
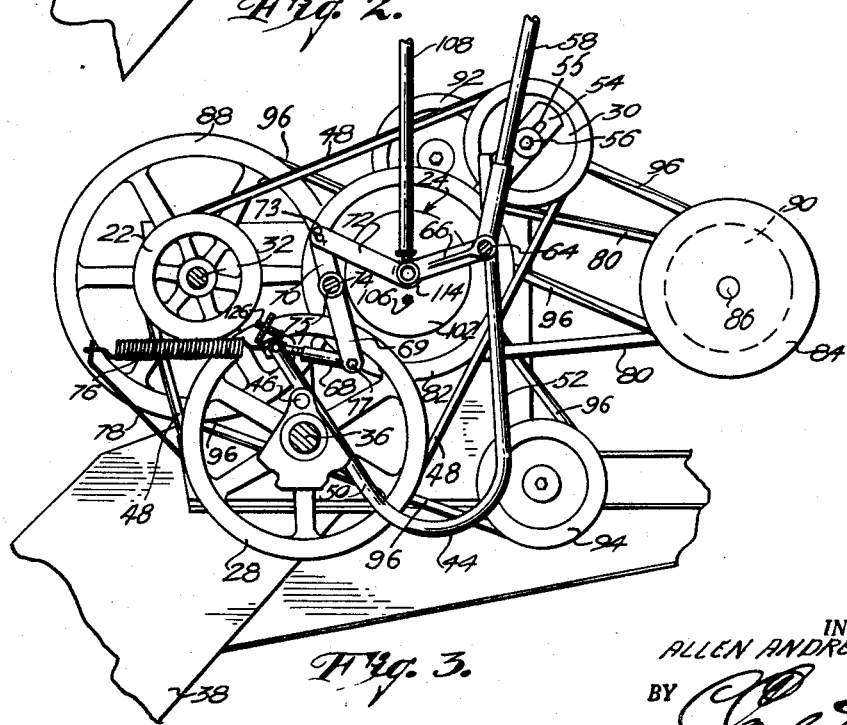
Fig. 3.
INVENTOR.
ALLEN ANDREW WHITE
BY
ATTORNEY May 17, 1960   A. A. WHITE   2,936,840
STEERING STRUCTURE FOR FARM IMPLEMENTS AND THE LIKE
Filed June 18, 1956   4 Sheets-Sheet 3
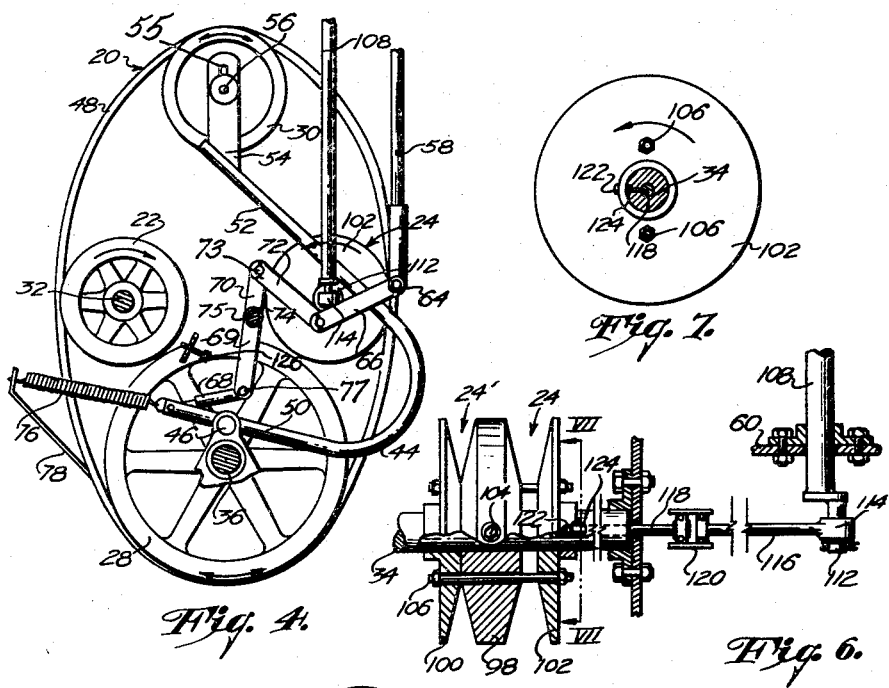
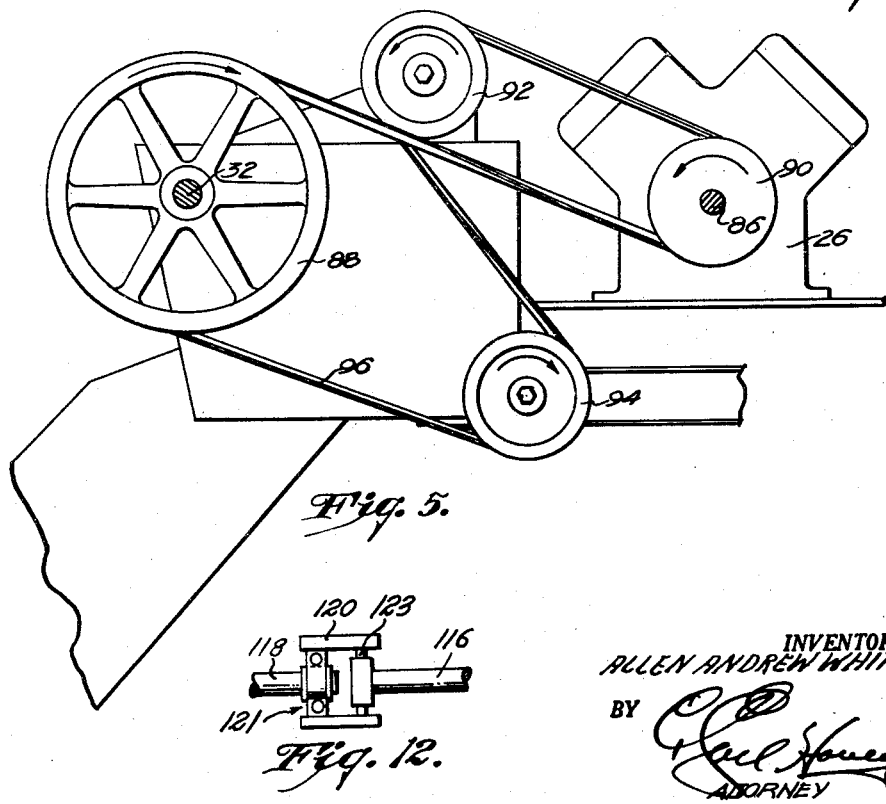
INVENTOR.
ALLEN ANDREW WHITE

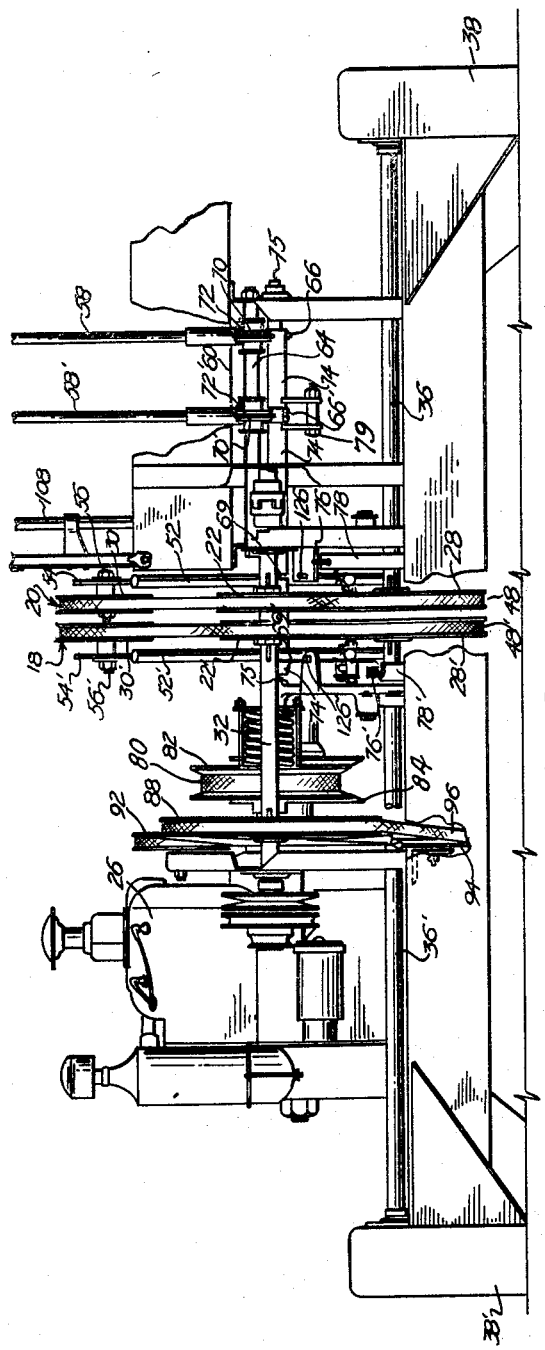

United States Patent Office 2,936,840
Patented May 17, 1960

2,936,840
STEERING STRUCTURE FOR FARM IMPLEMENTS AND THE LIKE

Allen Andrew White, Peabody, Kans., assignor to Hesston Manufacturing Co., Inc., Hesston, Kans., a corporation of Kansas Application June 18, 1956, Serial No. 592,083

13 Claims. (Cl. 180—6.66)

This invention relates to power transmission mechanism having many useful purposes, but adapted particularly for steering a mobile vehicle as power is transmitted to ground-engaging wheels for the primary purpose of advancing the vehicle or causing the same to move in reverse, the most important object being to permit driving of either of a pair of ground wheels, or both, at the will of the operator so that relatively sharp turns may be executed with ease and facility and so that the vehicle may be guided and maneuvered along any desired path of travel.

It is a primary object of the instant invention to provide power transmission in the nature of steering structure that is especially adapted for use in connection with farm implements and including as a part thereof duplicate belt and pulley units under direct control of the operator through manually manipulable levers to the end that as the levers are swung through predetermined paths of travel, the implement is caused to move forwardly or in reverse and along straight or curved paths of travel as may be desired or become necessary when the implement is placed in use.

Another important object of the present invention is the provision of power transmission mechanism having a driven member that is rotated in either of two directions, depending upon the position of a continuous belt with respect to a pair of oppositely rotating driving elements, the said belt being moved to opposite ends of its path of travel through the medium of a swingable idler operably connected with a manually manipulable lever as aforementioned.

Still another important object of the present invention is the provision of power transmission mechanism having spaced driving elements as aforementioned operable to alternately rotate the said driven member as the continuous flexible device, such as a belt, is swung into engagement with the selected drive element and held in a taut condition thereagainst.

A further object of the instant invention is the provision in a power transmission of the aforementioned character of novel support means for the swingable idler pulley which support is in turn capable of yieldably maintaining the continuous belt in a taut condition when the same operably engages one of the drive elements by virtue of the fact that such support is U-shaped and of resilient material.

A still further object of the instant invention is to incorporate with said resilient support for the idler pulley and with the manually manipulable lever, toggle linkage or the like capable of releasably holding the idler pulley in at least one of its operative positions against a stop, for example, until the operator is desirous of manipulating the lever to vary the speed of the corresponding ground wheel, or place the same in neutral or reverse.

It is an aim of the invention illustrated in the drawings and about to be described to provide additionally in connection with the power transmission mechanism and steering structure above outlined, a fine adjustment or auxiliary steering mechanism capable of permitting maneuvering of the vehicle at least while the same moves in one direction without necessity of operating either of the two primary steering levers.

Another aim of the present invention is the provision of a variable speed pulley constituting one of the drive members of one of the primary power transmission mechanisms together with manually operable means connected with the variable speed pulley for permitting limited steering of the vehicle while the two primary control levers are set in one position with their corresponding idler pulley at one end of its path of travel.

Other aims and objects relate to important details of construction and advantageous features, all of which will be made clear or become apparent as the following specification progresses, reference being had to the accompanying drawings wherein:

Fig. 2 is an enlarged fragmentary view similar to Fig. 1 and partially in section illustrating the position of parts when both steering levers are at the forwardmost ends of their paths of travel;

Fig. 3 is a view similar to Fig. 2 showing the relative position of parts when the two steering levers are at the rearmost ends of their paths of travel;

Fig. 4 is a fragmentary, vertical, cross-sectional view showing one of the power transmission mechanisms in a neutral position as in Fig. 1;

Fig. 5 is a substantially vertical cross-sectional view showing in elevation the operable connection between the prime mover and one of the driven elements of the two primary power transmission mechanisms;

Fig. 6 is a fragmentary elevational view of the fine-line steering structure illustrating the other drive members of the mechanisms, one of which is in the nature of a variable speed pulley, parts being broken away and in section for clearness;

Fig. 7 is a fragmentary detailed cross-sectional view taken on line VII—VII of Fig. 6;

Fig. 8 is a fragmentary front-elevational view of the steering structure of the implement shown in Fig. 1;

Fig. 9 is an elevational view similar in parts to Fig. 4, showing a modified form of connection between one of the steering levers and its corresponding idler pulley support with the said lever at one end of its path of travel;

Fig. 10 is a view similar to Fig. 9 showing the manual control lever in neutral;

Fig. 11 is a view similar to Figs. 9 and 10 illustrating the control lever at the opposite end of its path of travel; and Fig. 12 is an enlarged view of the joint shown in Fig. 6.

Figure 1:
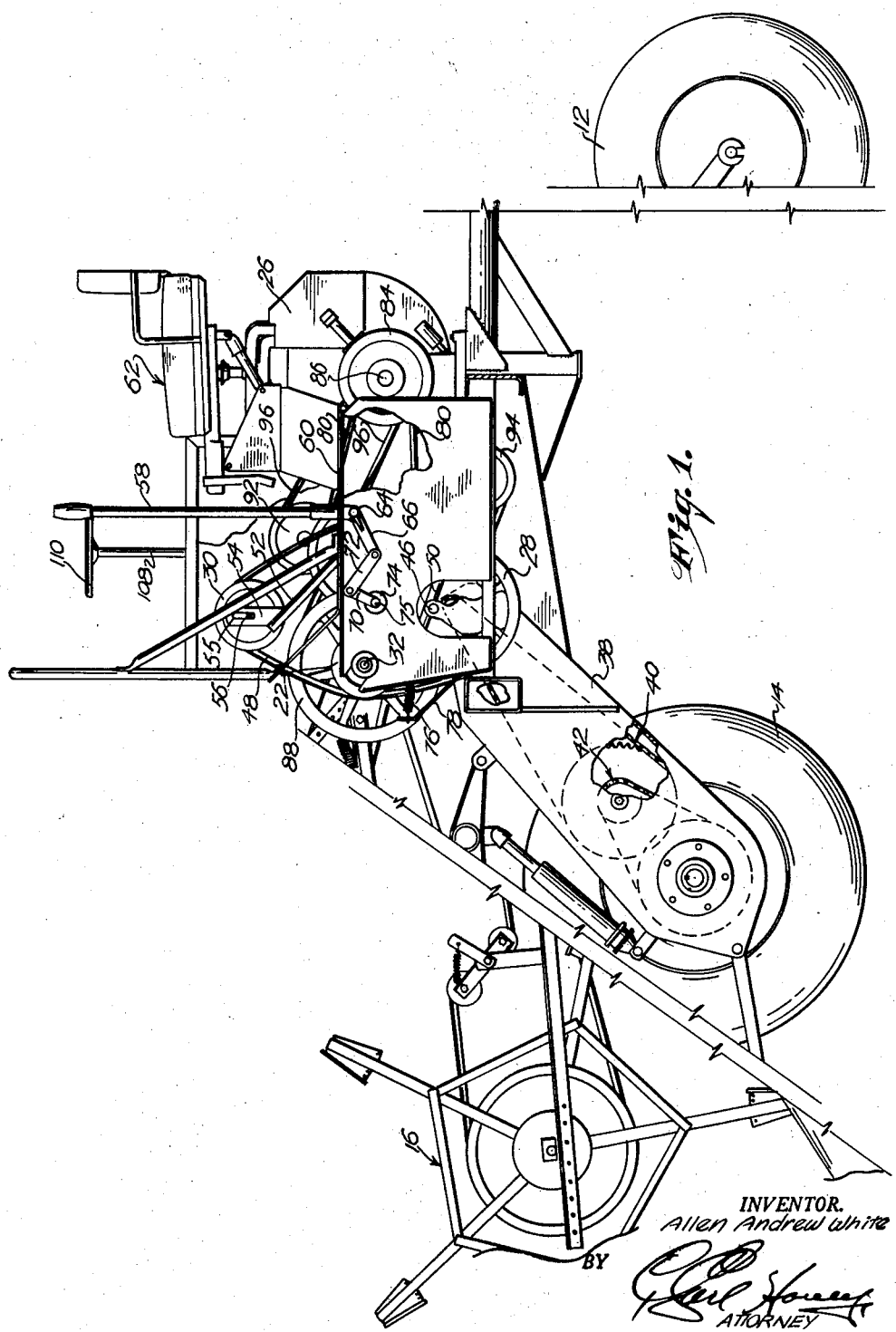
Figure 1 is a fragmentary side-elevational view of one type of farm implement with which the instant invention is adapted to be used, parts being broken away to reveal details of construction of the novel steering structure in the nature of power transmission mechanism.

The implement chosen for illustration of the principles of the instant invention and included in part by Figs. 1 and 8 of the drawings, is in the nature of a swather supported in its entirety by a rear caster wheel 12 and a pair of opposed ground-engaging drive wheels, one only of which is illustrated in Fig. 1 and designated by the numeral 14. The implement includes as a part thereof a sickle bar and platform (not shown) above which is rotatably disposed a conventional reel 16, but inasmuch as the improvements about to be described may be employed in connection with virtually any mobile vehicle, or wherever power transmission is needed, no further details of construction or operation of the implement shown in Figs. 1 and 8 need be set forth.

The steering structure for driving the wheels 14 either forwardly or in reverse includes a pair of primary power transmission mechanisms broadly designated by the numerals 18 and 20, and inasmuch as they are substantially identical, the unit 20 only as illustrated in Figs. 1-4, inclusive, will be described. Where duplicate parts on opposite sides are provided, such parts will bear similar numbers with one set of numbers being primed. For ease in description, only one set of numbers will be specifically referred to.

Referring especially to Fig. 4 of the drawings, the power transmission mechanism 20 includes a pair of horizontally spaced drive elements 22 and 24 that constantly rotate in opposite directions when driven by prime mover 26. A driven member 28 is disposed beneath the elements 22 and 24, preferably within a vertical plane midway between the elements 22 and 24 and an idler member 30 is spaced directly above the member 28 and above the elements 22 and 24 when the member 30 is in the neutral position shown in Fig. 4 of the drawings.

Elements 22 and 24 are secured directly to shafts 32 and 34, respectively, for rotation therewith, it being understood that the drive elements 22' and 24' of mechanism 18 are likewise secured to shafts 32 and 34 respectively, for rotation therewith.

Driven member 28 is, on the other hand, attached directly to a shaft 36 operably connected with corresponding wheel 14 through the medium of structure contained within housing 38 (see Fig. 1). Such structure may consist of a pair of operably connected chain and sprocket wheel assemblies broadly designated by the numerals 40 and 42.

Looking again to Fig. 4 of the drawings, the idler member 30 is mounted on a U-shaped support 44 that is in turn swingably carried by the frame of the implement adjacent the shaft 36 by a pivot pin 46. A continuous flexible device 48 such as a belt is trained over the elements 22 and 24 and the members 28 and 30.

The drive elements 22 and 24, the driven member 28 and the idler member 30 are all preferably in the nature of pulleys disposed within a common vertical plane as seen in Fig. 8 of the drawings. Consequently, it is seen that the axes of rotation of shafts 32, 34 and 36, as well as the axis of rotation of idler pulley 30 and the axis of swinging movement of support 44 about pivot pin 46 are horizontal and in parallelism.

The support 44 for idler pulley 30 is preferably in the nature of a resilient U-shaped loop having a lower leg 50 and an upper leg 52. The lower leg 50 is carried by the pivot pin 46 whereas upper leg 52 receives the idler pulley 30 through the medium of a laterally extending bracket 54 that is slotted at 55 to adjustably receive stub shaft 56 of the idler pulley 30. The tension of the belt 48 in either of the two positions of the idler pulley 30 shown in Figs. 2 and 3 may, therefore, be varied by shifting the idler pulley 30 with respect to the bracket 54 toward and away from the pivot pin 46.

The idler pulley 30 is swung through its path of travel about the horizontal axis of pivot pin 46 through the medium of a manually manipulable lever 58 that extends upwardly through platform 60 of the implement forwardly of the operator's seat 62. The lowermost end of the levers 58 and 58' are rotatably or hingedly mounted on a single, stationary horizontal shaft 64 disposed beneath the platform 60 and extending toward the mechanism 20. A lateral extension 66 is rigid to the lowermost end of the lever 58 for swinging movement therewith as a unit.

Toggle linkage operably interconnecting the extension 66 and the lower leg 50 of loop 44 includes element 68 and links 69, 70 and 72, the link 70 being adjacent lever 58 beneath platform 60 and rigidly secured to a rotatable tube 74. Link 72, disposed below platform 60, has one end pivotally connected to the uppermost end of the link 70 as at 73 and its other end with the outermost end of the extension 66, whereas the element 68 has one end pivotally connected to the forwardmost end of the leg 50 and its other end to the lowermost end of the link 69 as at 77, link 69 being transversely spaced from link 70 and link 69 also being rigid to tube 74. It is to be noted that for purposes of adjustment, the element 68 is extensible. A spring 76 connects the forwardmost free end of the leg 50 with a bracket 78 that is in turn carried by the framework of the implement. Tube 74 comprises two portions each of which, as shown in Fig. 8, is telescoped on a rotatable shaft 75, one on each side of the lever 58'. Shaft 75, to which lever 58' is rigidly secured, has transversely-spaced links 69' and 70' affixed thereto so that movement of lever 58' rotates shaft 75 and the affixed links 69' and 70'. As shown in Fig. 8, the two portions of tube 74 are rigidly connected together by a coupling 79 which bridges link 70' and lever 58' so that swinging movement of lever 58 is transmitted to support 44 by means of the rigidly interconnected portions of tube 74. Link 70 is rigid to tube 74 on one side of coupling 79 and link 69 is rigid to tube 74 on the opposite side of coupling 79.

During operation of the primer mover 26, the drive pulley 24 is driven in the direction of the arrow shown in Fig. 4 through the medium of a continuous belt 80 (Figs. 2, 3 and 8) trained over pulleys 82 and 84, secured to shaft 34 and power shaft 86, respectively, the latter of which is the drive shaft of prime mover 26 as seen in Fig. 5. The drive pulley 22 is, however, driven in the opposite direction as shown by the arrow in Fig. 4 from the prime mover 26 through the medium of the arrangement shown in Fig. 5 of the drawing. To this end, pulleys 88 and 90 are affixed to shafts 32 and 86, respectively, and the frame of the implement carries a pair of idler pulleys 92 and 94. A continuous belt 96 is trained over the pulleys 88, 90, 92 and 94, it being seen in Fig. 8 that the pulleys 92 and 94 are offset in opposite directions with respect to two aligned pulleys 88 and 90 for preventing undue wear in the belt 96 which would otherwise occur by stretches thereof rubbing together at the point of crossing adjacent the pulley 92.

Secondary steering control structure operable in conjunction with the primary power transmission mechanisms 18 and 20 is best seen in Figs. 6 and 7 of the drawings. In this connection, the drive pulleys 24 and 24' are in the nature of a composite unit, including a center section 98 and a pair of outermost sections 100 and 102. The center section 98 is secured to the shaft 34 for rotation therewith through the medium of a set screw or the like 104, and the sections 100—102 are interconnected by a plurality of bolts 106 slidable in section 98.

The sections 100 and 102 are reciprocable or slidable on the shaft 34 toward and away from the center section 98, presenting the pulleys 24 and 24' of varying diameters, to drive the belts 48—48' and, therefore, the pulleys 28—28' at varying speeds when the belts 48—48' are in operative engagement with the pulleys 24—24' as shown in Fig. 2 of the drawings. The pressure of belts 48—48' on pulleys 24—24' keeps sections 100—102 in proper relationship.

A steering post 108 extending upwardly through the platform 60 to one side of the steering levers 58 and 58' carries a steering wheel 110 on the uppermost end thereof and an eccentrically disposed stub shaft 112 on its lowermost end. A collar or bearing 114 on one end of a shaft 116 is rotatable on the stub shaft 112 and couples with a shaft 118 by a joint 120 having a bearing 121 for shaft 118. A pin 123 pivotally attaches shaft 116 to joint 120. The shaft 118 is rotatable within joint 120 and extends into the proximal end of the shaft 34 for reciprocation along the longitudinal, horizontal axis of rotation of shaft 34. Shaft 118 connects with the outer section 102 of pulley 24 through the medium of a set screw or the like 122. It is to be noted that the shaft 34 is provided with a short clearance slot 124 for the fastening means 122. The joint 120 not only permits rotation of the shaft 118 with the shaft 34, and with respect to the shaft 116, but permits swinging of the latter with respect to the shaft 118 during rotation of the steering post 108 and, therefore, its depending stub shaft 112.

For clearness of illustration, both of the levers 58 and 58' are shown vertical in the neutral position in Fig. 4, both are shown swung forwardly in Fig. 2 and both are illustrated in Fig. 3 of the drawings retracted to the rearmost ends of their paths of travel toward the operator's seat 62. Fig. 1 of the drawing similarly shows the neutral position of both of the steering levers 58 and 58'.

In operation, it is clear that when the levers 58 and 58' are vertically disposed as shown in Figs. 1 and 4, belts 48 and 48' will be wrapped rather loosely around their corresponding pulleys 22—22', 24—24', 28—28', and 30—30'. Consequently, even during continuous operation of prime mover 26, driving both of the pulleys 22 and 22' clockwise, viewing Fig. 4, and rotating both pulleys 24 and 24' anticlockwise, viewing Fig. 4, no rotative movement will be imparted to the pulleys 28 and 28', and therefore, shafts 36 and 36' as well as corresponding wheels 14 remain motionless.

Manifestly, the speed of operation of the prime mover 26, preferably in the nature of a gasoline engine, may be varied through conventional throttle control means (not shown), but when the two power transmission mechanisms 18 and 20 are neutral, pulleys 22—22' are driven idly from power shaft 86 through pulley 90 and belt 96 which in turn drives pulley 88 and therefore the shaft 32 to which the two drive pulleys 22 and 22' are affixed. By the same token, the two pulleys 24—24' i.e., the composite unit shown in Fig. 6 of the drawings, will rotate idly with the shaft 34 as the latter is driven directly from the shaft 86 through pulleys 82 and 84 and belt 80.

When it is desired to move forwardly in a straight line, the steering wheel 110 is first rotated to in turn rotate the post 108, swing the stub shaft 112, and shift the shafts 116 and 118 to the left, viewing Fig. 6. As the shaft 118 slides inwardly with respect to the shaft 34 and as the fastener 122 slides along the slot 124, the pulley section 102 is moved toward the center section 98 as it slides on the shaft 34. With the diameters of the pulleys 24 and 24' thus equalized, belts 48 and 48', respectively, will be driven at the same rates of speed when such belts are brought into engagement with their corresponding pulleys 24 and 24'.

This is accomplished by swinging both of the levers 58 and 58' forwardly to the forwardmost ends of their paths of travel as illustrated in Fig. 2 of the drawings. It is seen by viewing Figs. 2 and 4 that such swinging movement of lever 58 about the shaft 64 anticlockwise swings the extension 66 downwardly and rearwardly. Extension 66 exerts a pull upon the link 72 which in turn, by virtue of its pivotal connection with the link 70, rotates the tube 74 clockwise. As the lowermost end of the link 69 swings upwardly and forwardly, the distance between tube 74 and the outermost, forwardmost end of the leg 50 is increased. The supporting loop 44 for the idler pulley 30 is thereby swung anticlockwise about the axis of pivot pin 46 and against the action of spring 76.

The links 68 and 69 are permitted to swing slightly beyond center, i.e., beyond a straight line connecting tube 74 and the outermost free end of the leg 50 before striking an adjustable stop 126. The idler pulley 30 is therefore releasably held in the position shown in Fig. 2 of the drawings permitting the operator to release his grip on the lever 58.

It is seen in Fig. 2 of the drawings that when the pulley 30 is disposed at the forwardmost end of its path of travel, belt 48 is brought against the pulley 24 and swung away from the pulley 22, the latter continuing to rotate clockwise, viewing Fig. 2, without any effect upon the ground wheels 14. Rotation of the shaft 34, and therefore the pulley 102, causes rotation of the drive pulley 28 and, of course, the idler pulley 30 anticlockwise which drives the shaft 36 to rotate the wheel 14 that can be seen in Fig. 1 through the interconnection 40—42 between shaft 36 and the wheel 14. By the same token, when the lever 58' is also at the forwardmost end of its path of travel, belt 48' will be driven from pulley 24' to in turn rotate the shaft 36' and a corresponding wheel 14 forwardly in the same direction as the wheel 14 shown in Fig. 1 is driven.

At any time the operator positioned on seat 62 desires to manipulate a turn or guide the implement to the left or to the right, it is but necessary but to manipulate the levers 58 and 58'. For example, while lever 58 is in the position shown in Fig. 2, the lever 58' might be retracted toward the seat 62, thereby releasing the tension of belt 48' on pulley 24', causing the implement to veer to the right because of the greater speed of travel of the wheel 14 shown in Fig. 1. In fact, if the lever 58' is moved to a neutral position as shown in Fig. 4 while the lever 58 is at the forwardmost end of its path of travel, in the manner illustrated by Fig. 2, the wheel corresponding to shaft 36' will no longer be driven and, by virtue of continued driving of the wheel 14 shown in Fig. 1, the implement will turn about a vertical axis and continue to rotate 360° if such is desired.

It is contemplated, however, that minor turning movements in the implement may be executed independently of the levers 58 and 58', and while the same are at the forwardmost ends of their paths of travel. This is accomplished by manipulation of the steering wheel 110 since the speed of rotation of the pulley 28 is increased as soon as the pulley section 102 is shifted away from the center section 98. It is contemplated that the pulleys 24 and 24' will be of substantially the same effective diameter when the pulley sections 100—102 are equally spaced from the section 98. Consequently, manipulation of the steering wheel 110 will cause the implement to veer to the right whenever the pulley sections 100—102 are retracted to increase the diameter of pulley 24 and decrease the diameter of pulley 24'; and to the left whenever the pulley sections 100—102 are moved toward the pulley 82 to increase the diameter of pulley 24' and decrease the diameter of pulley 24.

It is manifest that levers 58 and 58' must be pulled toward the seat 62 to the neutral position shown in Figs. 1 and 4 before the implement can be placed in reverse. The reverse action is accomplished by retracting the levers 58 and 58' to the rearmost ends of their paths of travel as shown in Fig. 3 which causes the idler pulleys 30 and 30' to swing their corresponding belts 48 and 48' to a position engaging pulleys 22 and 22', respectively.

A safety factor is provided, as seen in Fig. 3 for reverse operation in that support 44 strikes shaft 36 before the extension 66 and link 72 are permitted to closely approach alignment. Accordingly, as soon as the levers 58 and 58' are released by the operator, the springs 76 and 76' automatically return both power transmission mechanisms 18 and 20 to the neutral position.

The fine-line steering shown in Fig. 6 of the drawings is ineffective and not believed necessary for reverse travel and such steering in reverse may be effected by manipulation of the levers 58 and 58' toward and away from the rearmost ends of their paths of travel.

The particular nature of the supports 44—44' is extremely important. The formation thereof in substantially U-shaped loops and the utilization of somewhat resilient material in the manufacture thereof places a yieldable bias upon the corresponding idler pulleys 30 and 30' whenever the latter are either at the forwardmost or rearward ends of their paths of travel. Viewing Fig. 2, for example, it is seen that belt 48 is kept in a taut condition tightly engaging not only the drive pulley 24, but the driven pulley 28 and as the leg 52 tends to yield toward the leg 50, the resiliency within the bight of the loop 44 will tend to bias the pulley 30 upwardly and forwardly away from the pivot point 46, thereby maintaining the belt 48 stretched to its limit provided, of course, that the pulley 30 is properly adjusted with respect to its supporting bracket 54. The same effect of the loop 44 upon the belt 48 is apparent in Fig. 3 when the idler pulley 30 is disposed to hold the belt 48 tightly against the drive pulley 22.

In Figs. 9 to 11, inclusive, there is shown a modified form of operable connection between manual lever 158 and support or loop 144 for an idler pulley (not shown) comparable to pulleys 30—30'. It is seen that U-shaped loop 144 is provided with a lower leg 150 and an upper leg 152, together with a slotted bracket 154 rigid to the leg 152 for receiving such idler pulley. The lower leg 150 of loop 144 is swingably supported by pivot pin 146 adjacent shaft 136 in much the same manner as above described with respect to the form illustrated in Figs. 1 to 8, inclusive. Similarly, the lever 158 is rotatable on shaft 164 and is provided with a lateral extension 166 rigid thereto.

Additionally, in the form shown in Figs. 9–11, there is provided a second lateral extension 166a rigid to lever 158 for rotation therewith and extending oppositely to the extension 166. The two extensions 166 and 166a are joined by a chain 172 that passes beneath a rotatable sprocket wheel 170 rigid to a tube 174 rotatable on shaft 175. The tube 174 has a short lateral extension 169 rigidly secured thereto which is in turn pivotally connected to an elongated arm 168a adjacent one end of the latter. The opposite end of the arm 168a is in turn adjustably and pivotally connected to an extension 168b rigid to the lowermost and forwardmost end of the leg 150 through the medium of a bolt or the like, 163. The tightness of the chain 172 may be varied through the medium of a plate 166b swingable on the extension 166a and to which one end of the chain 172 is attached. The limits of swinging movement of the lever 158 are determined by adjustable stops 226a and 226b, depending from the arm 168a and alternately engageable with the tube 174 as seen in Figs. 9 and 11. In all respects, however, the two power transmission mechanisms 18 and 20 operate essentially the same whether the toggle linkage shown, for example, in Fig. 4 is employed, or the connecting structure of Figs. 9 to 11, inclusive, is utilized.

Having thus described the invention, what is claimed as new and desired to be secured by Letters Patent is:

1. In power transmission mechanism, a pair of horizontally spaced drive pulleys; a prime mover having a power shaft; means interconnecting the power shaft and one of the drive pulleys for rotating the latter in one direction; means interconnecting the power shaft and the other drive pulley for rotating the latter in the opposite direction; a driven pulley beneath the drive pulleys; a U-shaped, resilient loop having an upper and a lower leg; pivot means adjacent the driven pulley mounting the lower leg for swinging movement of the loop; an idler pulley normally disposed above the drive and driven pulleys within a vertical plane common thereto, said idler pulley being mounted on the upper leg for rotation on a horizontal axis parallel with the axes of rotation of the drive and driven pulleys and with the axis of swinging movement of said loop; a continuous belt trained over the pulleys; and manually manipulable structure connected with said loop for swinging the same to force the belt against either of said drive pulleys whereby to rotate the driven pulley in either direction.

2. In a power transmission, a frame; a pair of longitudinally spaced drive shafts rotatably carried by the frame; a drive pulley secured to each shaft respectively; a driven pulley rotatably carried by the frame; an idler pulley spaced from the driven pulley and coplanar with the latter and with the drive pulleys; a continuous, normally stationary belt trained around the pulleys; a substantially U-shaped support for the idler pulley normally looped around one of said shafts and having a pair of legs and a bight; pivot means mounting one of said legs on the frame for swinging movement of the support about an axis substantially parallel with the axes of the pulleys; means rotatably mounting the idler pulley on the other of said legs; and control means carried by the frame and coupled with said support for swinging the latter to tighten the belt against either of said drive pulleys, said pivot means being disposed to position said bight in close looped relationship to said one shaft when the belt engages the drive pulley of the latter and remote from said one shaft when the belt engages the other of said drive pulleys.

3. In a power transmission, a frame; a pair of longitudinally spaced, horizontal drive shafts rotatably carried by the frame; a drive pulley secured to each shaft respectively; a driven pulley rotatably carried by the frame below the drive pulleys; an idler pulley spaced from the driven pulley and coplanar with the latter and with the drive pulleys above the latter; a continuous, normally stationary belt trained around the pulleys; a substantially U-shaped support for the idler pulley normally looped around one of said shafts and having a pair of legs and a bight; pivot means mounting one of said legs on the frame for swinging movement of the support about an axis substantially parallel with the axes of the pulleys; means rotatably mounting the idler pulley on the other of said legs; and control means carried by the frame and coupled with said support for swinging the latter to tighten the belt against either of said drive pulleys, said pivot means being disposed to position said bight in close looped relationship to said one shaft when the belt engages the drive pulley of the latter and remote from said one shaft when the belt engages the other of said drive pulleys, and being disposed to position said other leg substantially horizontally, overlying the shafts when the belt engages said drive pulley of said one shaft, and substantially vertically when the belt engages said other drive pulley.

4. In a power transmission, a frame; a prime mover on the frame; a pair of longitudinally spaced drive shafts rotatably carried by the frame; a drive pulley secured to each shaft respectively; a driven pulley rotatably carried by the frame below the drive pulleys; an idler pulley spaced from the driven pulley and coplanar with the latter and with the drive pulleys; a continuous, normally stationary belt trained around the pulleys; a substantially U-shaped support for the idler pulley normally looped around one of said shafts and having a pair of legs and a bight; pivot means mounting one of said legs on the frame for swiging movement of the support about an axis substantially parallel with the axes of the pulleys; means rotatably mounting the idler pulley on the other of said legs; control means carried by the frame and coupled with said support for swinging the latter to tighten the belt against either of said drive pulleys, said pivot means being disposed to position said bight in close looped relationship to said one shaft when the belt engages the drive pulley of the latter and remote from said one shaft when the belt engages the other of said drive pulleys; means coupling the prime mover with said one shaft for driving the latter continuously in one direction; and means coupling the prime mover with the other shaft for driving the latter continuously in the opposite direction.

5. In a power transmission, a frame; a pair of longitudinally spaced drive shafts rotatably carried by the frame; a drive pulley secured to each shaft respectively; a driven pulley rotatably carried by the frame; an idler pulley spaced from the driven pulley and coplanar with the latter and with the drive pulleys; a continuous, normally stationary belt trained around the pulleys; a substantially U-shaped support for the idler pulley normally looped around one of said shafts and having a pair of legs and a bight; pivot means mounting one of said legs on the frame for swinging movement of the support about an axis substantially parallel with the axes of the pulleys; means rotatably mounting the idler pulley on the other of said legs; a manual control lever; means mounting said lever on the frame for swinging movement in a plane substantially parallel with the plane of said pulleys and the plane of swinging movement of said support; and means coupling the lever with said support to swing the latter in response to swinging of the lever to thereby tighten the belt against either of said drive pulleys, said pivot means being disposed to position said bight in close looped relationship to said one shaft when the belt engages the drive pulley of the latter and remote from said one shaft when the belt engages the other of said drive pulleys.

6. In a power transmission, a frame; a prime mover on the frame; a pair of longitudinally spaced drive shafts rotatably carried by the frame; a drive pulley secured to each shaft respectively; a driven pulley rotatably carried by the frame; an idler pulley spaced from the driven pulley and coplanar with the latter and with the drive pulleys; a continuous, normally stationary belt trained around the pulleys; a support for the idler pulley; pivot means mounting the support on the frame for swinging movement about an axis substantially parallel with the axis of the pulleys; means rotatably mounting the idler pulley on the support; control means carried by the frame and coupled with said support for swinging the latter to tighten the belt against either of said drive pulleys; means coupling the prime mover with one of said shafts for driving the latter continuously in one direction; and means coupling the prime mover with the other shaft for driving the latter continuously in the opposite direction.

7. In a power transmission, a frame; a prime mover on the frame; a pair of longitudinally spaced, horizontal drive shafts rotatably carried by the frame; a drive pulley secured to each shaft respectively; a driven pulley rotatably carried by the frame below the drive pulleys; an idler pulley spaced from the driven pulley and coplanar with the latter and with the drive pulleys above the latter; a continuous, normally stationary belt trained around the pulleys; a substantially U-shaped support for the idler pulley normally looped around one of said shafts and having a pair of legs and a bight; pivot means mounting one of said legs on the frame for swinging movement of the support about an axis substantially parallel with the axes of the pulleys; means rotatably mounting the idler pulley on the other of said legs; control means carried by the frame and coupled with said support for swinging the latter to tighten the belt against either of said drive pulleys, said pivot means being disposed to position said bight in close looped relationship to said one shaft when the belt engages the drive pulley of the latter and remote from said one shaft when the belt engages the other of said drive pulleys, and being disposed to position said other leg substantially horizontally, overlying the shafts when the belt engages said drive pulley of said one shaft, and substantially vertically when the belt engages said other drive pulley; means coupling the prime mover with said one shaft for driving the latter continuously in one direction; and means coupling the prime mover with the other shaft for driving the latter continuously in the opposite direction.

8. In a power transmission, a frame; a pair of longitudinally spaced, horizontal drive shafts rotatably carried by the frame; a drive pulley secured to each shaft respectively; a driven pulley rotatably carried by the frame below the drive pulleys; an idler pulley spaced from the driven pulley and coplanar with the latter and with the drive pulleys above the latter; a continuous, normally stationary belt trained around the pulleys; a substantially U-shaped support for the idler pulley normally looped around one of said shafts and having a pair of legs and a bight; pivot means mounting one of said legs on the frame for swinging movement of the support about an axis substantially parallel with the axes of the pulleys; means rotatably mounting the idler pulley on the other of said legs; a manual control lever; means mounting said lever on the frame for swinging movement in a plane substantially parallel with the plane of said pulleys and the plane of swinging movement of said support; and means coupling the lever with said support to swing the latter in response to swinging of the lever to thereby tighten the belt against either of said drive pulleys, said pivot means being disposed to position said bight in close looped relationship to said one shaft when the belt engages the drive pulley of the latter and remote from said one shaft when the belt engages the other of said drive pulleys, and being disposed to position said other leg substantially horizontally, overlying the shafts when the belt engages said drive pulley of said one shaft, and substantially vertically when the belt engages said other drive pulley.

9. In a power transmission, a frame; a prime mover on the frame, a pair of longitudinally spaced drive shafts rotatably carried by the frame; a drive pulley secured to each shaft respectively; a driven pulley rotatably carried by the frame; an idler pulley spaced from the driven pulley and coplanar with the latter and with the drive pulleys; a continuous, normally stationary belt trained around the pulleys; a substantially U-shaped support for the idler pulley normally looped around one of said shafts and having a pair of legs and a bight; pivot means mounting one of said legs on the frame for swinging movement of the support about an axis substantially parallel with the axes of the pulleys; means rotatably mounting the idler pulley on the other of said legs; a manual control lever; means mounting said lever on the frame for swinging movement in a plane substantially parallel with the plane of said pulleys and the plane of swinging movement of said support; means coupling the lever with said support to swing the latter in response to swinging of the lever to thereby tighten the belt against either of said drive pulleys, said pivot means being disposed to position said bight in close looped relationship to said one shaft when the belt engages the drive pulley of the latter and remote from said one shaft when the belt engages the other of said drive pulleys; means coupling the prime mover with said one shaft for driving the latter continuously in one direction; and means coupling the prime mover with the other shaft for driving the latter continuously in the opposite direction.

10. In a power transmission, a frame; a pair of longitudinally spaced drive shafts rotatably carried by the frame; a drive pulley secured to each shaft respectively; a driven pulley rotatably carried by the frame; an idler pulley spaced from the driven pulley and coplanar with the latter and with the drive pulleys; a continuous, normally stationary belt trained around the pulleys; a support for the idler pulley; pivot means mounting the support on the frame for swinging movement about an axis substantially parallel with the axis of the pulleys; means rotatably mounting the idler pulley on the support; a manual control lever; means mounting said lever on the frame for swinging movement in a plane substantially parallel with the plane of said pulleys and the plane of swinging movement of said support; and means coupling the lever with said support to swing the latter in response to swinging of the lever to thereby tighten the belt against either of said drive pulleys, said means coupling the lever with the support including toggle linkage having an over center action in one direction for releasably holding the lever at one end of its path of travel.

11. In a vehicle having a frame, a prime mover on the frame, a pair of ground-engaging wheels supporting the frame and a pair of longitudinally spaced drive shafts rotatably carried by the frame, a power transmission on the frame for each wheel respectively, each including a drive pulley secured to each shaft respectively; a driven pulley rotatably carried by the frame; an idler pulley spaced from the driven pulley and coplanar with the latter and with the drive pulleys; a continuous, normally stationary belt trained around the pulleys; a support for the idler pulley; pivot means mounting the support on the frame for swinging movement about an axis substantially parallel with the axis of the pulleys; means rotatably mounting the idler pulley on the support; control means carried by the frame and coupled with said support for swinging the latter to tighten the belt against either of said drive pulleys; means coupling the prime mover with one of said shafts for driving the latter continuously in one direction; means coupling the prime mover with the other shaft for driving the latter continuously in the opposite direction; and structure coupling each wheel with its corresponding driven pulley.

12. In a vehicle having a frame, a pair of ground-engaging wheels supporting the frame and a pair of longitudinally spaced drive shafts rotatably carried by the frame, a power transmission on the frame for each wheel respectively, each including a drive pulley secured to each shaft respectively; a driven pulley rotatably carried by the frame; an idler pulley spaced from the driven pulley and coplanar with the latter and with the drive pulleys; a continuous, normally stationary belt trained around the pulleys; a support for the idler pulley; pivot means mounting the support on the frame for swinging movement about an axis substantially parallel with the axis of the pulleys; means rotatably mounting the idler pulley on the support; a manual control lever; means mounting said lever on the frame for swinging movement in a plane substantially parallel with the plane of said pulleys and the plane of swinging movement of said support; means coupling the lever with said support to swing the latter in response to swinging of the lever to thereby tighten the belt against either of said drive pulleys; and structure coupling each wheel with its corresponding driven pulley.

13. In a vehicle having a frame, a pair of ground-engaging wheels supporting the frame and a pair of longitudinally spaced drive shafts rotatably carried by the frame, a power transmission on the frame for each wheel respectively, each including a drive pulley secured to each shaft respectively; a driven pulley rotatably carried by the frame; an idler pulley spaced from the driven pulley and coplanar with the latter and with the drive pulleys; a continuous, normally stationary belt trained around the pulleys; a substantially U-shaped support for the idler pulley normally looped around one of said shafts and having a pair of legs and a bight; pivot means mounting one of said legs on the frame for swinging movement of the support about an axis substantially parallel with the axes of the pulleys; means rotatably mounting the idler pulley on the other of said legs; control means carried by the frame and coupled with said support for swinging the latter to tighten the belt against either of said drive pulleys, said pivot means being disposed to position said bight in close looped relationship to said one shaft when the belt engages the drive pulley of the latter and remote from said one shaft when the belt engages the other of said drive pulleys; and structure coupling each wheel with its corresponding driven pulley.

References Cited in the file of this patent

UNITED STATES PATENTS

| | | |
|---|---|---|
| 2,311,393 | Honeywell | Feb. 16, 1943 |
| 2,329,372 | Hitch | Sept. 14, 1943 |
| 2,450,262 | Winslow et al. | Sept. 28, 1948 |

FOREIGN PATENTS

| | | |
|---|---|---|
| 172,528 | Austria | Sept. 25, 1952 |